United States Patent [19]

Gleim

[11] 4,311,596
[45] Jan. 19, 1982

[54] EXTRACTION OF REUSABLE WATER FROM A MINERAL MINING PROCESS

[75] Inventor: William K. T. Gleim, Seattle, Wash.
[73] Assignee: Energy Modification Inc., Fla.
[21] Appl. No.: 149,731
[22] Filed: May 14, 1980
[51] Int. Cl.³ .............................................. C02F 1/54
[52] U.S. Cl. ................................... 210/711; 210/713; 210/725; 210/727; 210/907; 208/11 LE
[58] Field of Search ............... 210/639, 702, 725, 727, 210/907, 710, 711, 712, 713; 208/11 LE

[56] References Cited

U.S. PATENT DOCUMENTS

| | | | |
|---|---|---|---|
| 2,761,563 | 9/1956 | Waterman | 210/639 |
| 2,910,424 | 10/1959 | Tek | 208/11 LE |
| 2,968,603 | 1/1961 | Coulson | 208/11 LE |
| 3,108,059 | 10/1963 | Greenwald | 208/11 LE |
| 3,331,765 | 7/1967 | Canevari | 208/11 LE |
| 3,450,633 | 6/1969 | Siemers | 210/725 |
| 3,487,003 | 12/1969 | Baillie | 210/704 |
| 3,516,795 | 6/1970 | Tsuk | 210/725 |
| 3,717,574 | 2/1973 | Wernecke | 210/725 |
| 3,816,305 | 6/1974 | Schutte | 210/702 |
| 4,029,568 | 6/1977 | Pittman | 208/11 LE |
| 4,051,027 | 9/1977 | Batzer | 210/702 |
| 4,057,485 | 11/1977 | Blaine | 208/11 LE |
| 4,210,531 | 7/1980 | Wang | 210/727 |

FOREIGN PATENT DOCUMENTS 637442 2/1962 Canada ........................ 208/11 LF

OTHER PUBLICATIONS

Rough Draft Translation of Italian Patent No. 378,454 issued to Spinelli and Issued Feb. 10, 1940.

Primary Examiner—Ernest G. Therkorn
Attorney, Agent, or Firm—Peter J. Georges

[57] ABSTRACT

A method for the treatment of an aqueous effluent slime derived from a tar sand extraction process is disclosed. The effluent slime pH is adjusted to an acidic pH and treated with an anionic surface active agent to create flocculation of solid asphaltic material entrained within the slime. A solvent solution comprising chlorinated hydrocarbon and a solvent therefor is added so that upon centrifuging of the treated slime three physical layers of material comprising (1) water; (2) asphaltics in the solvent solution and (3) clay are formed.

30 Claims, 1 Drawing Figure

EXTRACTION OF REUSABLE WATER FROM A MINERAL MINING PROCESS

BACKGROUND OF THE INVENTION

The object of this invention is to provide a feasible and economic process for major mining industries to treat clay slime effluent material containing a large percentage of contaminated water to extract the latter for portable and/or industrial reuse. As currently practiced, the mining industry consumes a great quantity of water to remove phosphate rock, china clay, diamond and bauxite minerals from the earth in addition to various tarsand oil extraction processes. In these various mining processes large amounts of intractable stable clay slimes are produced containing a great quantity of water (generally about 80 to 90%), thereby forcing the mining industries to build huge lagoons to hold the aforementioned waste slimes. While most of these operations are situated in a rural setting and therefore space is not a detriment to the formation of these lagoons, the same are still becoming quite expensive as a result of their continuous maintenance and having to initially extract the earth to form the lagoons. The instant clay slimes are also an environmental problem in that fish and plant life will not readily flourish in these lagoons which usually contain rather toxic asphaltenes. A mining operation in which water is used only one time is also expensive on account of the fact that a portion of the mineral to be mined is dissolved in an aqueous solution with the clay slimes and thereby unattainable to the miner. It is therefore an object of this invention to provide an economically viable process to remove these minerals and obtain clear reconsumable water in addition to the clay.

The instant process provides a means to accomplish the above ends for the mining industry in an economical manner and provides for the additional recovery of the desired materials which gives the various mineral obtention processes greater affirmative pecuniary leverage.

PRIOR ART

In 1967 a U.S. Pat. No. 3,331,765 issued to Canevari et al, disclosed a system for the treatment of an aqueous phase resulting from an athabasca tar sands removal system. This teaching encompasses a disclosure of a primary and secondary treatment zone of the tar sands with water to form a froth containing no more than 15% solid material. This same froth is charged to a tertiary treating zone wherein the relevant components are separated into a purified oil stream and a water plus solids stream by means of treatment with a chemical additive comprising demulsifying transfer and chelating agents. The aforementioned transfer agent is added to promote the transfer of solid fines from the oil/water interface into the aqueous phase by establishing a uniform electropotential over the entire surface of the particles. Such transfer agents are disclosed as tetrosodium pyrophosphate, sodium tirpolyphosphate, potassium pyrophosphate, sodium hexametaphosphate or sodium silicate. The demulsifying agent is described as a nonionic surface active compound such as a polyethoxyalkylene polymer. The chelating agent is added to remove heavy material such as zircon, rutile, ilmenite, etc. and will comprise ethylene-diamine-tetra-acetic acid, sodium gluconate, gluconic acid, sodium oxalate and diethylene glycol. In U.S. Pat. No. 3,487,003 issued to Baillie et al. in 1969, a system is disclosed wherein fine suspended clay is removed by flocculating and centrifuging the resultant floc to obtain a pure water stream for reuse in a tar sands oil extraction process. This disclosure recognizes that conventional technqiues for treating the primary water effluent from a tar sands water-steam extraction process are not viable to remove suspensions of salt and clay from the water. Thus, a system is devised for the combination of a flocculating system and a centrifuging system to recapture a great percentage of the water for reuse. The disclosed flocculation system may be accomplished by any of three well known conventional mechanisms (1) neutralization of electrical repulsive forces surrounding the small particles which will enable the Vander Waals cohesive forces to hold the particles together and thereby agglomerate the same;

(2) precipitation of voluminous flocs, such as metal hydroxides, which will entrap the fine particles and cause an agglomerization; and (3) bridging of particles to cause agglomerization by natural of synthetic long-chain high-molecular weight polymers such as polyelectrolytes, such as a polyethylene oxide polymer.

The patentee in that case recognizes that the pH of the flocculation step is important to obtain the maximum flocculation. Normally, the effluent discharge from a hot water tar-sands extraction process possesses a pH in the range of from about 7.5 to 9.0. It is desirable to either (1) raise the pH above 9.0 or (2) lower it to below 7.5 and preferably in the range of 7.0 to 7.5 Thus, this disclosure is made that the pH should be varied from its typical value of 7.5 to 9.0, however, no disclosure is made of modifying the pH value to a quality less than neutral, 7.0. After the flocculation step, a centrifugation step is performed to segregate the agglomerated particles in the bottom layer of the centrifugate and thereby provide an easy method to filter or decant a reusable aqueous phase from the centrifugate, which contains the entrained clay and solid particles.

In U.S. Pat. No. 3,816,305, issued to Schutte in 1974, a method is disclosed for clarifying the water derived from a tar sands extraction process. In essence, this system involves the introduction of sulfuric acid into the water to reduce the pH to a range of 5.5 to 7 to cause flocculation and coagulation of the clays and solid materials contained therein. The water is allowed to stand for several days to allow the pH to recover to a substantially neutral condition (7.0) at which time it is free of entrained solids and may be returned to its natural source. The patentees indicate that the water must first return to a neutral pH before total agglomeration or flocculation of the unwanted materials is accomplished. In U.S. Pat. NO. 4,051,027 Batzer et al. a process is disclosed for settling waste slime solids from a phosphate or processing operation which comprises the addition of at least two pounds of hydrogen peroxide per ton of suspended solids. This addition of hydrogen peroxide causes a flocculation of such materials as suspended attapulgite, montmorillonite and fine sands from an aqueous suspension.

Thus, the prior art has discussed various ways to obtain a purified water stream from a water effluent obtained in a mining process but unitl now has not set forth a disclosure encompassing the combinative interaction of hereinafter defined novel steps.

SUMMARY OF THE INVENTION

This invention relates to the treatment of a water effluent stream which has previously been utilized in the extraction of minerals from their indigenous location in the ground. This application is concerned with the treatment of water which has been utilized in phosphate rock, china clay, diamond, and bauxite mining operations. A preferred aspect of this process resides in the treatment of a water effluent stream from a tar sand extraction system wherein the resultant slime comprises the unwanted residum of the oil-extraction process.

DETAILED DESCRIPTION OF THE INVENTION

Figure 1:
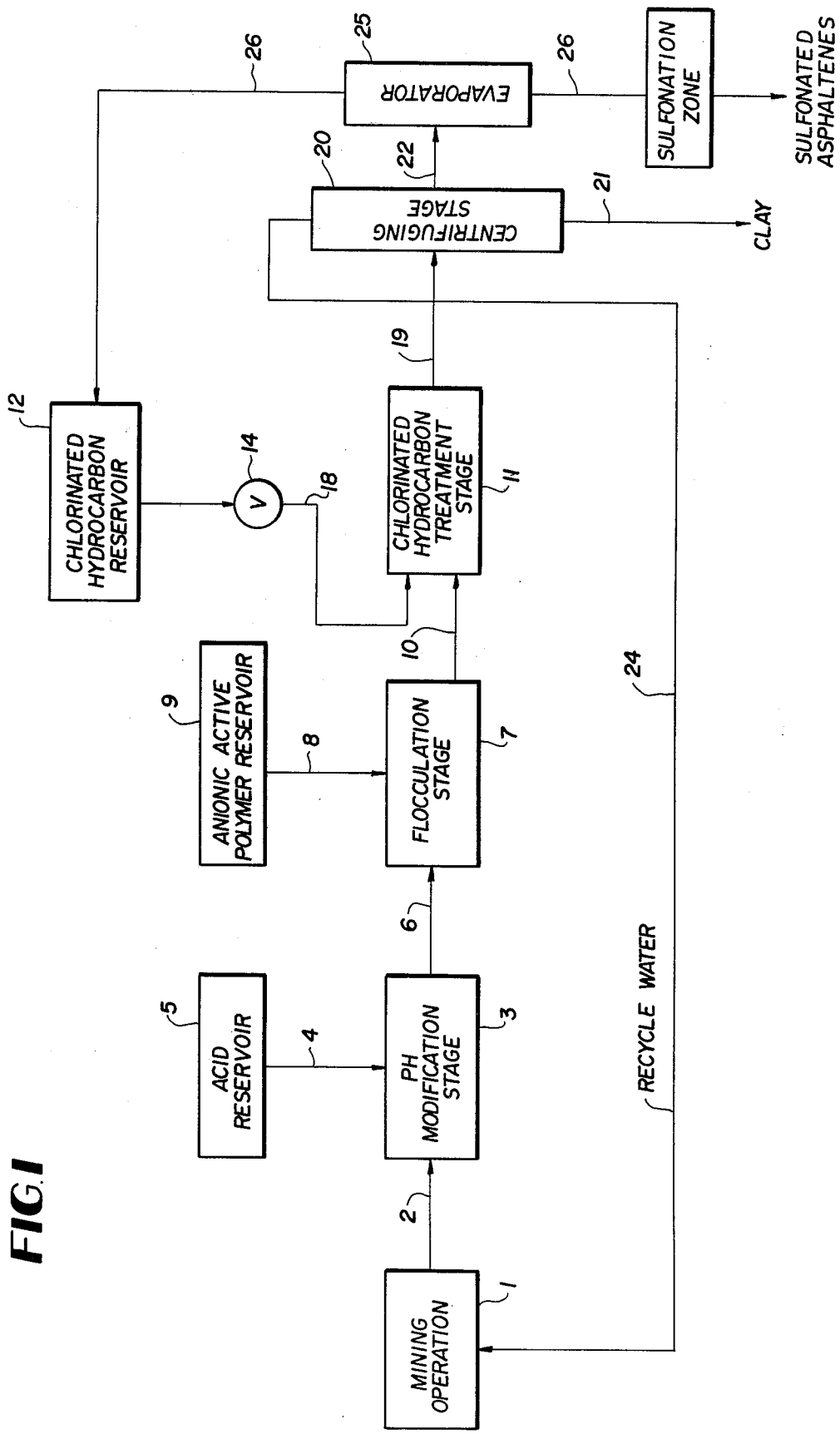

An object of this invention is to provide a process for the easy and economical treatment of large quantities of an aqueous effluent stream derived from a athabasca tar sands extraction process.

Another object of this invention is to provide a system for the treatment of a water effluent stream of an athabasca tar sands extraction process which will enable the recycling of a purified water stream to the extraction process without consuming undue expensive organic chemicals to treat the extraction slime via flocculation.

An embodiment of this invention resides in a process for the treatment of an aqueous effluent slime derived from a tar sands extraction process comprising water, asphaltic material and clay which comprises:

(a) reducing the pH of said effluent slime to a pH of about 2 to about 5 by the addition of an acidic compound thereto;

(b) treating said effluent slime of reduced pH with an anionic surface active. agent (suitably about 0.001 to about 1 wt%) to create flocculation of solid asphaltic material entrained within said slime;

(c) treating said flocculated effluent slime with about 5 to about 10 wt% of chlorinated hydrocarbon diluted with an aromatic solvent of the BTX type; and (d) centrifuging said treated effluent slime to produce three physical layers of material which comprise: (1) water; (2) asphaltics dissolved in said chlorinated hydrocarbon solution; and (3) clay. BTX type solvent is an aromatic solvent containing benzene, toluene or xylene or mixtures thereof.

For a simple separation of the three components of the slime water, oil, clay, it was found experimentally that it is best to have a mixed solvent of at least 1.1 density and preferably a mixed solvent having a density of from about 1.1 to about 1.2. This facilitates the separation into the three layers: water on top, bitumen solution in the middle and clay on the bottom.

The overall process comprises three distinct treatment steps followed by a centrifugation step. The first step of the instant process is to treat the extraction slime, such as an athabasca tar sand extraction slime, with an acidic agent to implement modification of the pH of the slime to about 2 to about 5. As disclosed in Ballie et al., the normal pH of the slime is usually in the range of about 8 to 9. Thus, a strong mineral acid is necessary and sufficient to accomplish this pH modification step. Such mineral acids will generally include hydrochloric acid, sulfuric acid, or any other equivalent mineral acid. Although not preferred, some organic carboxylic or even dicarboxylic acids may also be utilized as the acidic agent which acids will generally contain from about 1 to about 10 carbon atoms exclusive of the carboxyl moiety. The second step of this process is the addition of an anionic surface active agent, suitably in a concentration of 0.001 to 1 wt%. This anionic surface active agent addition should be made with the slime possessing a pH in a range of about 2 to about 5. Thus, this process does not require that the pH be raised to a neutral level before flocculation can be induced. Surprisingly, it has been found that the addition of these anionic surface active agents will cause a flocculation at the adjusted lower pH in contradistinction to stabilizing the clay emulsion which normally would prevent agglomeration of any of the fine particles. The anionic surface active agents may be exemplified by any of the four following types of anionic surface active agents:

(1) an alkylaryl sulfonic acid wherein the alkyl group contains from 6 to 12 carbon atoms;

(2) an alkyl sulfonic acid wherein the alkyl group contains from 8 to 18 carbon atoms;

(3) an alkyl alcohol sulfate wherein the alkyl group contains from about 12 to about 18 carbon atoms; and/or (4) the polyoxyethylene ethers of nonylphenol. These agents may be used singularly or in a combined manner to create the flocculation at the lower acidic pH. It is also within the scope of this invention that any other equivalent anionic polymer known to cause flocculation may also be used in this process, such as those disclosed at columns 4 and 5 of the aforementioned patent to Baillie et al. U.S. Pat. No. 3,487,003 or those taught in the patent to Canevari et al. U.S. Pat. No. 3,331,765, the applicable specific teachings of which are both incorporated by reference herein to further highlight the applicable anionic surface active agents.

Although all the above-mentioned anionic surfactants will work, a far more economical anionic surfactant can be produced from the recovered asphaltics (bitumen) itself by sulfonation. Most known sulfonation procedures are applicable. Indeed it has been discovered that heating the recovered bitument with about 10% its weight concentrated $H_2SO_4$ to 80°–90° C. for about one hour is sufficient.

Subsequent to the reduction in the pH and the treatment with the anionic surface active agent to create flocculation from about 5 to about 10 wt.% chlorinated hydrocarbons is added to the slime. Preferably, the hydrocarbons are aliphatic in nature, however, those of cyclic nature may also be cited. Examples of known chlorinated hydrocarbons useful in this process are chloroform, trichloroethylene, dichloromethane, dichlorethylene or any other chlorinated hydrocarbon containing from 1 carbon atom to about 10 carbon atoms and containing from 1 to up to about 8 chloro substitutions. Generally, the chlorinated hydrocarbon should have a boiling point of from about 50° C. to about 150° C. The 5 to 10 wt.% chlorinated hydrocarbon is based on the weight of slime and thus, 5 to 10 wt.% of chlorinated hydrocarbon is added to aid the requisite extraction per unit of weight slime. This applicable amount of hydrocarbon may also be determined on a per volume basis, but such calculation should result in the addition of about 5 to 10 wt.% of chlorinated hydrocarbon per weight of the slime. The chlorinated hydrocarbons are added in solution with a solvent being selected on the basis of its degree of solubility of the instant chlorinated hydrocarbon and its feasibility in the instant process. The preferred solvents will comprise aromatic liquids such as benzene, toluene, and o-, p- and m- isomers of xylene or mixtures thereof. In a preferred embodiement of this invention regarding the solvent, it is contemplated that the amount of aromatics present as a solvent not exceed sixty percent. Thus, the solvent mixture, that is, the combination of chlorinated hydrocarbon and aromatic solvent, will possess a density of not lower than about 1.1 and preferably a density of from about 1.1 to about 1.2. The chlorinated hydrocarbon is generally present in solution, but the amount of chlorinated hydrocarbon added to the slime in such case hereagain is adjusted to obtain satisfactory removal of asphaltic material.

ILLUSTRATIVE EMBODIMENTS

In this illustrative embodiment a water effluent stream from an athabasca tar sand extraction process is recovered and treated as hereinafter set forth to produce clear water, clay and asphaltic material. The athabasca tar sand extraction slime is first treated with sulfuric acid to lower the temperature of the slime to a pH in the range of about 2 to about 5. After this pH reduction, octyl aryl sulfonic acid is added in a concentration of 0.05 weight percent at which time noticeable agglomeration of the fine particle is observed within the slime. After this flocculation, a 7 wt.% (based on the per unit weight of the slime) of chloroform diluted with an equal amount of benzene is added to the slime. Each of the three steps above set forth treatment steps which are performed at ambient conditions of pressure and temperature to effect the requisite separations. The resultant mixture is centrifuged to obtain clear water which is recycled to the athabasca tar sand extraction process to obtain the bitumen from the sand. This illustrative embodiment is directed to a tar sand extraction process, however, any mineral mining operation which uses a substantial amount of water is deemed applicable.

This above illustrative embodiment was described in a batch type method of operation. However, it is contemplated within this invention to encompass a continuous method of operation wherein the addition of the mineral acid, anionic surface active agent, chloridated hydrocarbon diluted with a mixture of BTX and centrifugation are continually and senquentially performed on an effluent slime.

DETAILED DESCRIPTION OF THE DRAWING

The instant process is depicted in FIG. 1 which shows the instant sequential steps or stages of process operaton.

The applicable mining operation 1 is representative of any mining operation, which may include an athabasca tar sands oil recovery system. Although not all the various mining effluent streams are herein shown, the one concerned with this invention, which would be the effluent clay slime steam containing clay, water and asphaltenes is shown exiting the mining operation and depicted as conduit 2. It is, of course, contemplated within mining operation 1 that other various streams may be taken off for the purposes of obtaining the desired metal or oil of the mining operation. The instant invention resides in the treatment of this aqueous clay slime stream present in conduit 2 which is first passed to the pH modification stage 3 possessing an inlet conduit 4 in interconnection with a mineral acid reservoir 5. This acid reservoir contains one of the aforementioned mineral acids, such as sulfuric acid, which is passed to modification stage 3 via conduit 4. The pH of the slime effluent stream in conduit 2 is approximately 7 to 9 versus the pH in pH modification stage effluent conduit 6, which is approximately 2 to 5. This stream is passed to flocculation stage 7, wherein it is contacted with an anionic active polymer via conduit 8 from anionic active polymer reservoir 9. The flocculation will occur in stage 7, and the effluent including the floc will be passed via conduit 10 to be contacted with a chlorinated hydrocarbon-aromatic mixture in the chlorinated hydrocarbon treatment stage 11. This chlorinated hydrocarbon-aromatic mixture is derived from reservoir 12. Valve 14 controls the flow of chlorinated hydrocarbon-aromatic mixture. The chlorinated hydrocarbon is added to stage 11 based on the weight of the slime contained therein. Once this latter fact has been determined, valve 14 will open and thus deliver from about 5 to about 10 wt.% of chlorinated hydrocarbon per unit weight of slime. If it is not preferred to operate in this manner, the 5 to 10 wt.% chlorinated hydrocarbon, suitably in an aromatic solvent to provide a density of from about 1.1 to about 1.2, can be added neat to stage 11. This addition produces a chlorinated hydrocarbon effluent treatment stream which exits stage 11 via conduit 19. This effluent is passed to centrifuging stage 20, wherein the treated flocculent mixture is separated into three physical layers: a top aqueous layer which is recovered from centrifuging stage 20 and recycled via line 24 to the mining operation; a bottom layer of clay which is recovered via line 21; and, an intermediate layer which is withdrawn from the centrifuge stage via line 22; introduced into evaporator 25 and therein separated into overhead and bottom fractions. The chlorinated hydrocarbons and aromatic solvent are removed from evaporator 25 overhead via line 26 and transfixed to chlorinated hydrocarbon reservoir 12. The asphaltanic material is withdrawn from evaporator 25 as bottoms via line 26, and, in the embodiment illustrated sulfonated in sulfonation zone 27 to form sulphonated asphaltenes which may be used as the anionic surface active agent introduced via line C.

The instant drawing has been provided in order to exemplify the instant process and such things as unimportant valves, motors, pumps and condensors have been eliminated in order to not unduly lengthen the description of this drawing.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim as my invention:

1. A process for the treatment of an aqueous effluent slime derived from a tar sands extraction process comprising water, asphaltic material and clay which comprises:
   (a) reducing the pH of said effluent slime to an acidic pH such that flocculation of a solid asphaltic material entrained within said slime with an anionic surface active agent is enabled;
   (b) treating said effluent slime of reduced pH with an anionic surface active agent to create flocculation of solid asphaltic material entrained within said slime; and,
   (c) adding to said flocculated effluent slime an additive comprising chlorinated hydrocarbon and a solvent therefor in an amount sufficient to provide, upon centrifuging of said treated effluent slime containing said additive, three physical layers of material comprising (1) water; (2) asphaltics dissolved in said additive; and, (3) clay.

2. The process of claim 1 wherein in step (a) the pH slime is reduced to an acidic pH of about 2 to about 5.

3. The process of claim 2 wherein the amount of said anionic surface active agent added is from about 0.001 to about 1 weight % based on the weight of effluent slime.

4. The process of claim 1 wherein the amount of said anionic surface active agent added is from about 0.001 to about 1 weight % based on the weight of effluent slime.

5. The process of claims 1, 2 or 4 wherein the additive comprises a solvent mixture of chlorinated hydrocarbon and aromatics.

6. The process of claim 5 wherein said aromatic in said solvent mixture comprises benzene, toluene, xylenes or mixtures thereof.

7. The process of claim 6 wherein the chlorinated hydrocarbon is chloroform trichloroethylene or mixtures thereof.

8. The process of claim 6 wherein said chlorinated hydrocarbon is present in an amount of from about 5 to about 10 weight % based on the weight of slime.

9. The process of claim 5 wherein said chlorinated hydrocarbon is present in an amount of from about 5 to about 10 weight % based on the weight of slime.

10. The process of claim 9 wherein the aromatics in said solvent mixture are present in an amount of from about 5 to about 10 weight % based on the weight of slime.

11. The process of claim 10 wherein the chlorinated hydrocarbon is selected from the group consisting of chloroform, dichloroethylene, trichloroethylene and mixtures thereof.

12. The process of claim 9 wherein said chlorinated hydrocarbon and said aromatic solvent are present in about equal amounts by weight.

13. The process of claims 1, 2 or 4 wherein the density of the solvent mixture is between about 1:1 and about 1.2.

14. The process of claim 13 wherein said aromatic in said solvent mixture comprises benzene, toluene, xylenes or mixtures thereof.

15. The process of claim 14 wherein the solvent mixture boiling range is from about 50° C. to about 150° C.

16. The process of claim 13 wherein the solvent mixture boiling range is from about 50° C. to about 150° C.

17. The process of claim 13 wherein the chlorinated hydrocarbon is chloroform trichloroethylene or mixtures thereof.

18. The process of claim 13 wherein said chlorinated hydrocarbon is present in an amount of from about 5 to about 10 weight % based on the weight of slime.

19. The process of claims 1, 2 or 4 wherein the solvent mixture boiling range is from about 50° C. to about 150° C.

20. The process of claim 19 wherein the chlorinated hydrocarbon is chloroform trichloroethylene or mixtures thereof.

21. The process of claim 19 wherein said chlorinated hydrocarbon is present in an amount of from about 5 to about 10 weight % based on the weight of slime.

22. The process of claims 1, 2 or 4 wherein the chlorinated hydrocarbon is chloroform trichloroethylene or mixtures thereof.

23. The process of claim 22 wherein said chlorinated hydrocarbon is present in an amount of from about 5 to about 10 weight % based on the weight of slime.

24. The process of claims 1, 2 or 4 wherein the chlorinated hydrocarbon contains at least one chlorine substitute on a hydrocarbon of from 1 to 4 carbon atoms.

25. A process for the treatment of an aqueous effluent slime derived from a tar sands extraction process comprising water, asphaltic material and clay which comprises:
 (a) reducing the pH of said effluent slime to a pH of about 2 to about 6 by the addition of an acidic compound thereto;
 (b) treating said effluent slime of reduced pH with about 0.001 to about 1 weight % of an anionic surface active agent to create flocculation of solid asphaltic material entrained within said slime;
 (c) treating said flocculated effluent slime with 5 to 10 weight % of chlorinated hydrocarbon and a solvent therefor comprising an aromatic compound selected from the group consisting of benzene, toluene, xylenes or mixtures thereof; and,
 (d) centrifuging said treated effluent slime to produce three physical layers of material which comprise: (1) a top layer of water; (2) an intermediate layer of asphaltic material dissolved in said chlorinated hydrocarbon solution; and, (3) clay.

26. The process of claim 25 wherein the aqueous effluent slime is derived from an athabasca tar sand extraction process.

27. The process of claim 25 wherein the acidic compound is a mineral acid selected from the group consisting of sulfuric acid, nitric acid, and hydrochloric acid.

28. The process of claim 25 wherein said aqueous effluent slime comprising water, asphaltic material and clay possesses an original pH of about 8 to about 9, which is reduced to about 2 to about 5.

29. The process of claim 25 wherein at least a portion of the asphaltic material obtained from centrifuging step (d) is sulfonated to form an anionic surface agent and returned to step (b) as anionic surface active agent for treating effluent slime.

30. The process of claim 25 wherein the intermediate layer of asphaltic material (2) of step (d) is recovered; the asphaltic material is separated from the chlorinated hydrocarbon solution; the asphaltic material is sulfonated to form an anionic surface active agent; and, the sulfonated asphaltic material is returned to flocculation step (b) as anionic surface active agent for treating effluent slime.

* * * * *